(12) United States Patent
Martin

(10) Patent No.: US 6,294,007 B1
(45) Date of Patent: Sep. 25, 2001

(54) PAINTABLE ORGANOPOLYSILOXANE MOLD RELEASE COMPOSITIONS AND PROCESSES FOR THEIR USE

(75) Inventor: Eugene R. Martin, Onsted, MI (US)

(73) Assignee: Wacker Silicones Corporation, Adrian, MI (US)

( * ) Notice: Subject to any disclaimer, the term of this patent is extended or adjusted under 35 U.S.C. 154(b) by 0 days.

(21) Appl. No.: 09/206,687

(22) Filed: Dec. 7, 1998

(51) Int. Cl.⁷ ........................................ B28B 7/36
(52) U.S. Cl. ..................... 106/38.22; 528/30; 528/38; 528/43
(58) Field of Search ................. 106/38.22; 528/30, 528/38, 43

(56) References Cited

U.S. PATENT DOCUMENTS

| | | |
|---|---|---|
| 3,864,756 | 2/1975 | Desimone . |
| 3,883,628 | 5/1975 | Martin . |
| 4,029,827 * | 6/1977 | Imperial et al. ..................... 427/22 |
| 4,251,277 * | 2/1981 | Martin ............................ 106/38.22 |
| 4,477,366 * | 10/1984 | Robertson ......................... 252/182 |
| 4,612,055 * | 9/1986 | Manis et al. ...................... 106/287.11 |
| 4,624,899 * | 11/1986 | Macaigne et al. .................. 428/447 |
| 4,772,409 * | 9/1988 | Mori et al. ........................ 252/78.3 |
| 5,064,544 * | 11/1991 | Lin et al. ............................ 252/88 |
| 5,428,089 * | 6/1995 | Ishikawa et al. ..................... 524/188 |

FOREIGN PATENT DOCUMENTS

| | | |
|---|---|---|
| 0 191 261 A1 | 12/1985 | (EP) . |
| 0 668 137 A2 | 2/1995 | (EP) . |
| 1118838 * | 7/1968 | (GB) . |
| 09012886 A2 | 1/1997 | (JP) . |

OTHER PUBLICATIONS

Patent Abstracts of Japan Publication No. 07316432, Publication Date May 12, 1995, Applicant Shin Etsu Chem Co Ltd.

* cited by examiner

Primary Examiner—Margaret G. Moore
(74) Attorney, Agent, or Firm—Brooks & Kushman P.C.

(57) ABSTRACT

Silicone mold release compositions which are a stable blend of hydrophobic-modified organopolysiloxane and an aminoorgano- or mercaptoorgano-functional organopolysiloxane, or a solution in organic solvent of a stable or unstable blend, provide exceptional mold release properties while retaining paintability of molded parts.

19 Claims, No Drawings

PAINTABLE ORGANOPOLYSILOXANE MOLD RELEASE COMPOSITIONS AND PROCESSES FOR THEIR USE

TECHNICAL FIELD

The subject invention pertains to organopolysiloxane mold release compositions which display enhanced paintability.

BACKGROUND ART

Mold release compositions have long been used to facilitate the release of molded polymer parts from molds. Particularly in the case of parts having complex shapes or deep sections, and more particularly in the case of polymers which display aggressive adhesion to the mold surface, production of parts without an effective mold release would not be possible.

A wide variety of mold releases exist. Early mold releases relied on natural and synthetic waxes. Often, molds would have to be hand or machine buffed to obtain maximum release. Such mold release agents are not practical for modern high speed production rates. One advantage of such mold releases, however, is that they are often paintable without wiping or cleaning, and can be readily removed as well.

Aqueous soap solutions and dispersions are sometimes used as mold releases. However, soaps are not highly effective, and cannot be used with moisture sensitive molding compositions such as polyurethane RIM unless allowed to thoroughly dry. If still moist, surface defects and local foaming may occur in polyurethane RIM.

Polyurethane RIM has been especially problematic due to its natural tendency to adhere to molds. A considerable advance in RIM technology was the introduction of internal mold releases based on zinc stearate in conjunction with fatty substances such as fatty esters and epoxidized natural oils. These mold releases are incorporated into the reactive composition prior to molding. Unfortunately, in order to provide consistent, multiple releases, such internal mold releases must be used at high levels. For parts which must be painted, these high levels of use impair paintability. Decreasing the amount of internal mold release, however, increases the difficulty of release. Thus, such systems generally employ external mold releases in conjunction with internal mold releases.

Organopolysiloxanes such as trimethylsiloxy-terminated polydimethylsiloxane fluids have proven to be effective mold release agents, and when used in conjunction with aminoalkyl and thioalkyl-functional organopolysiloxanes, as disclosed in U.S. Pat. Nos. 4,251,277 and 3,883,628 provide extraordinary release.

Such organopolysiloxane fluids can be applied neat, in solution in organic solvent, or in the form of an aqueous emulsion. For pigmented moldings such as ski boots, roller blades, and the like, such mold releases are exemplary. Unfortunately, polydimethylsiloxane fluids are notorious for destroying paintability of molded parts, even after extensive wiping and washing operations. Common paint defects include uneven coverage, sometimes to the extent of large bare areas, orange peel, runs, sags, and particularly, fish eyes. The effects of such fluids on paintability is so severe, that some manufacturing plants ban all products containing polydimethylsiloxanes, even solid silicones such as gasketing material. Suppliers of O-ring seals and other products must frequently certify that their products contain no polydimethylsiloxanes.

Efforts to retain the advantages of polydimethylsiloxanes as mold release agents while retaining paintability have been only partially successful. Modification of these siloxanes by replacing a portion of the methyl groups with relatively hydrophobic hydrocarbon groups, e.g. $C_{4-30}$ alkyl groups, phenyl groups, and in particular, with α-methylphenylethyl groups, has resulted in siloxane mold releases which are sometimes paintable immediately after demolding and without further post treatment such as wiping or washing, and which rather uniformly display good paintability after such post treatment. An example of such fluids is Wacker TN available from Wacker Silicones, Adrian, Mich. Similar mold releases are disclosed by Japanese Kokai JP 09012886 A2.

Unfortunately, while exhibiting enhanced paintability, the aforementioned modified siloxanes are not nearly as efficient in their mold release properties as straight polydimethylsiloxanes that contain aminoorgano- or thiolorgano-functional organopolysiloxane. This is particularly the case where deep sections and/or aggressively adhering polymer systems are involved.

It would be desirable to provide a mold release composition which is comparable in ease of mold release with polydimethylsiloxanes that contain aminoorgano- or thiolorgano-functional organopolysiloxane(s), while being paintable as well.

DISCLOSURE OF INVENTION

The present invention pertains to mixtures of organopolysiloxanes based on hydrophobically modified polydimethylsiloxane fluids and aminoorgano- and/or mercaptoorgano-functionalized organopolysiloxanes. These compositions provide both excellent release and paintability when prepared as stable compositions as described below. Surprisingly, unstable compositions which are not suitable as paintable mold releases by themselves are rendered highly effective when dissolved in organic solvent.

BEST MODE FOR CARRYING OUT THE INVENTION

The mold release compositions of the subject invention contain, as active ingredients, an organofunctional organopolysiloxane and a hydrophobic-modified polyorganosiloxane. The compositions may be applied neat, from solution, or as a dispersion. Neat products must display stability as hereinafter defined. The compositions may also include additional organopolysiloxanes, silanes, rheology control agents, surfactants, etc., but are very preferably devoid of polydimethylsilicone fluids, including silanol terminated polydimethyl fluids such as α,ω-dihydroxylpolydimethylsiloxanes; and polydimethylsiloxanes having terminal or pendant hydrolyzable alkoxy or acetoxy groups. Alkoxy groups or other groups which are not hydrolyzable or hydrolyze only slowly may be acceptable for use as hydrophobicizing groups if these groups contain an appropriate hydrophobe.

The hydrophobic-modified polyorganosiloxane may be branched or linear, and contains moieties corresponding to:

$$R_a R_b^1 SiO_{1/2} \quad (I)$$

$$R_a R_b^1 SiO_{2/2} \quad (II)$$

$$R_a R_b^1 SiO_{3/2} \quad (III)$$

and $$SiO_{4/2} \quad (IV)$$

wherein

R is lower alkyl or alkylene, optionally interrupted by ether oxygen or thioether sulfur, such as methyl, n-propyl, i-propyl, n-butyl, vinyl, methoxymethlyl, methoxyethyl, ethoxymethyl, ethoxyethyl, methoxypropyl, and 2-thiobutyl. R preferably contains 4 carbon atoms or less, more preferably 3 or less carbon atoms, and in particular, 1 or 2 carbon atoms.

$R^1$ is a $C_4$–$C_{30}$ hydrophobic group optionally containing not more than one ether oxygen or thioether sulfur when the carbon content is less than $C_{10}$, and in general not more than two ether oxygen or thioether sulfur atoms for $C_{11}$–$C_{30}$ groups, in any case insufficient interspersed —O— and/or —S— to defeat the hydrophobicity of the $R^1$ hydrophobicizing group. The hydrophobic nature of the $R^1$ groups containing interspersed —O— and —S— atoms may be assessed by evaluating the paintability of molded parts prepared employing a mold release containing organofunctional polysiloxane and the candidate —O— or —S— containing hydrophobic-modified polysiloxane.

Preferred examples of $R^1$ are $C_{4-30}$, preferably $C_{6-20}$ alkyl, alkenyl, cycloalkyl, cycloalkenyl, aryl, alkaryl, and aralkyl groups. Non-limiting examples are 2-ethylhexyl, n-octyl, n-decyl, n-dodecyl, n-octadecyl, lauryl, stearyl, phenyl, tolyl, benzyl, phenylethyl, norbornenyl and particularly α-methylphenylethyl. Also particularly suitable are alkylated phenyl and napthyl groups, e.g. 4-nonylphenyl, 4-nonylphenylethyl, and 4-nonyl-2-methylphenylethyl, and the like, and alkyl-substituted cycloalkyl and cycloalkenyl such as 4-ethylcyclohexyl, 4-nonylcyclohexyl, 4-methylcyclohexyl, 2-cyclohexylhexyl, and the like.

The various R and $R^1$ groups may be substituted or unsubstituted. Examples of suitable substituents are alkoxy, cyano, and halo, preferably cyano and chloro substituents. Trifluoromethyl and other haloalkyl groups are also suitable.

It is possible that some of the R and/or $R^1$ groups may be replaced by hydroxy, halo, hydrido, or alkoxy groups, but these are preferably absent, the amounts present being preferably no more than is unavoidable in the preparation of the hydrophobic-modified organopolysiloxane. Most preferably, R is methyl and $R^1$ is phenyl, benzyl, phenylethyl, or α-methylphenylethyl. Other preferred $R^1$ groups are —$R^2$—$R^3$ wherein $R^2$ is an alkylene, cycloalkylene, or phenylene diradical, and $R^3$ is phenyl, naphthyl, tolyl, and the like. Essentially, $R^1$ may be any hydrophobic group which enhances paintability.

In formulae I, II, and III, a, b, and c may be 0, 1, 2, or 3, and the sum of a+b is such so as to be 3 for formula I, 2 for formula II, and 1 for formula III. Preferably, the hydrophobic-modified organosiloxanes contain not more than 10 mol percent of formula IV (Q units), more preferably not more than 5 mol percent, and most preferably only unavoidable amounts of Q units. The hydrophobic-modified organopolysiloxanes also contain preferably no more than 20 mol percent of the units of formulae III (T units) more preferably no more than 10 mol percent, yet more preferably no more than 5 mol percent, and most preferably 2 mol percent or less, for example with no T-units or only those which are unavoidable.

More preferably, the hydrophobic-modified organopolysiloxanes correspond to the formula

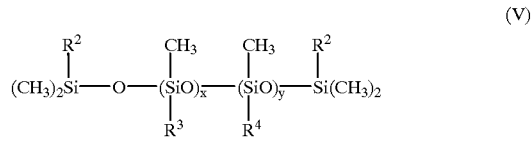

(V)

wherein $R^2$ is R or $R^1$, and $R^2$ is preferably methyl; or $R^2$ is $R^3$ or $R^4$; wherein $R^3$ is preferably an aryl or aralkyl group such as phenyl, tolyl, benzyl, phenylethyl, and in particular, α-methylphenylethyl; and wherein $R^4$ is preferably a $C_{18}$–$C_{20}$ alkyl, more preferably a $C_{10}$–$C_8$ alkyl group. The two terminal methyl groups of formula V may also be replaced by $R^2$, however, this is not preferred. Most preferably $R^2$ is methyl.

Most preferably, the hydrophobic-modified organopolysiloxanes are those corresponding to

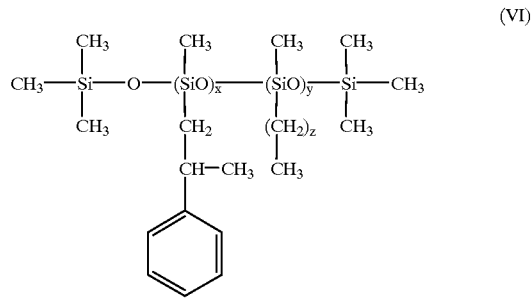

(VI)

In the above formulae, x, y, and z are positive integers, preferably such that z is an integer from 3 to 30, more preferably 4 to 24, and most preferably 5 to 18, and x and y are integers of from 0 to about 1000, more preferably 3 to 250, and most preferably 4 to 60, with the proviso that the sum of x+y is at least 5, and the molecules have, on average, at least 5 siloxy repeating units, preferably 10 to 100 repeating units, and most preferably 15 to 50 repeating units, corresponding to number average molecular weights of from greater than about 600 Da to about 600,000 Da or higher, and viscosities from about 10 cSt to about 20,000 cSt, preferably 50 cSt to about 5000 cSt.

The hydrophobic-modified organopolysiloxanes can be prepared by known methods, for example by hydrosilylation of 2-methylstyrene and like compounds, and terminal or non-terminal alkenes, and mixtures thereof, with organopolysiloxanes containing silicon-bonded hydrogen (SiH), for example organopolysiloxanes having terminal methylsilane or dimethylsilane groups, or internal methylhydrogensiloxy groups, in the presence of conventional hydrosilylation catalysts, particularly platinum catalysts.

The hydrophobic-modified organopolysiloxanes may also be prepared by condensation reactions, for example by condensation of SiH functional organopolysiloxanes with chlorohydrocarbons with generation of HCl, or when appropriate, by direct synthesis. The molecular weight and viscosity may be adjusted by equilibration and condensation reactions known in the art. Preferably, polydimethylsiloxanes containing no hydrophobicizing groups are absent during equilibration.

The organofunctional organopolysiloxanes which are a necessary component of the subject invention contain aminoorgano or mercaptoorgano functionality. In general, and in particular due to their mode of preparation, the organofunctional organopolysiloxanes may also contain hydrolyzable alkoxyl functionality. The aminoorgano and mercaptoorgano groups correspond generally to the formulae

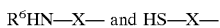
R⁶HN—X— and HS—X— where X is an Si-bound linking group, preferably an alkylene group optionally containing heteroatoms and heteroatom-containing groups such as, but not limited to

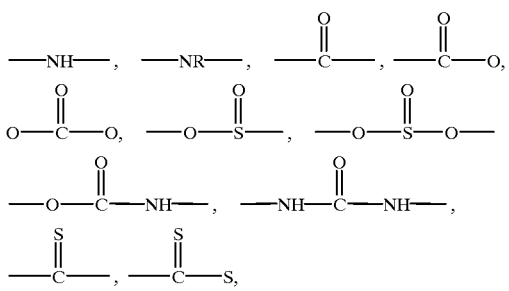

and the like, and $R^6$ is as defined below.

The linking group X may also be a phenylene, cycloalkylene, aralkyl, alkaryl, or similar group, and in general contains from 1 to about 30 carbon atoms, preferably 2 to 10 carbon atoms, and most preferably 3 to 5 carbon atoms.

Preferred aminoalkyl groups are those corresponding to the formula VI

—R⁵—[(NR⁶)—R⁷]$_t$NR⁸R⁹       (VII)

in which
R⁵ and R⁷ are divalent hydrocarbon groups, and R⁶, R⁸, and R⁹ are hydrogen or $C_{1-30}$ substituted or unsubstituted hydrocarbon groups, more preferably $C_1$–$C_{18}$ hydrocarbon groups, optionally containing interspersed heteroatoms or heteroatom-containing groups, and R⁵ is preferably a divalent $C_1$ to $C_{18}$ hydrocarbon radical, R⁶ is preferably a hydrogen atom or an unsubstituted $C_1$ to $C_{18}$ alkyl or aryl radical, wherein alkyl and aryl with respect to R⁶ may also include aralkyl and alkaryl radicals, respectively, R⁷ is preferably a divalent $C_1$ to $C_{18}$ hydrocarbon radical, R⁸ is preferably a hydrogen atom or an unsubstituted $C_1$–$C_{18}$ alkyl or aryl radical, wherein alkyl and aryl with respect to R⁸ may also include aralkyl and alkaryl radicals, respectively, R⁹ is preferably a hydrogen atom or an unsubstituted $C_1$–$C_{18}$ alkyl or aryl radical, wherein alkyl and aryl with respect to R⁹ may also include aralkyl and alkaryl radicals, respectively, and t is preferably an integer from 0 to 6.

Examples of divalent $C_1$- to $C_{18}$-hydrocarbon radicals represented by R⁵ and R⁷ are the methylene, ethylene, n-propylene, isopropylene, n-butylene, isobutylene, tert-butylene, n-pentylene, isopentylene, neopentylene, and tert-pentylene radicals; hexylene radicals such as the n-hexylene radical; heptylene radicals such as the n-heptylene radical; octylene radicals such as the n-octylene radical and isooctylene radicals such as the 2,2,4-trimethylpentylene radical; nonylene radicals such as the n-nonylene radical; decylene radicals such as the n-decylene radical; dodecylene radicals such as the n-dodecylene radical; and octadecylene radicals such as the n-octadecylene radical.

Examples of $C_1$- to $C_{18}$-alkyl radicals R⁶, R⁸ and R⁹ are methyl radicals, ethyl radicals, propyl radicals, butyl radicals, cyclohexyl radicals, pentyl radicals, hexyl radicals, decyl radicals, dodedecyl radicals, and octadecyl radicals. Examples of $C_1$ to $C_{18}$ aryl radicals represented by R⁶, R⁸ and R⁹ are benzyl radicals and naphthyl radicals.

Preferred mercapto groups are those of the formula

HS—R¹⁰—, wherein $R^{10}$ is an organic diradical corresponding to those derived from R⁵ and R⁷. Preferably, $R^{10}$ is ethylene, n-propylene, n-butylene, and in general, $C_1$–$C_{18}$ hydrocarbons optionally interspersed with —NH—, —NR—, —O—, —S—,

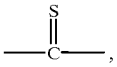

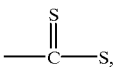

or one of the hetroatoms-containing groups previously identified. More preferably, $R^{10}$ is $C_{2-6}$ alkylene, most preferably $C_2$–$C_3$ alkylene, and in particular, n-propylene.

Suitable examples of R'(SR''')$_y$ groups include—$C_2SH$, —$CH_2H_4SH$,
—$C_3H_6SH$, $(HSCH_2)_2CHCH_2CH_2$—, $(HSCH_2CH_2)(HSCH_2)CH(CH_2)_4$—,
$(HSCH_2)CH_2)_3CCH_2CH_2$—,
$(HSCH_2CH_2)(HSCH_2)CHCH(CH_2SH)CH_2CH_2CH_2$—,
$HS(CH_2)_5CH(CH_2CH_2SH)CH_2CH_2CH(CH_2CH_3)$—,
$(HSCH_2CH_2)_2CHCH_2CH_2$—,
$(HSCH_2)_2CHSCH_2CH_2CH_2$—,
$(HSCH_2)_2(C_2H_5) CCH_2SCH_2CH_2CH_3$—,
$(HSCH_2)_3CCH_2SCH_2CH_2CH_2$—,
$(HSCH_2)(HSCH_2CH_2CH_2CH_2)CHSCH_2CH_2CH_2$—,
$(HSCH_2CH_2)_2CHCH_2SCH_2CH_2CH_2$—,
$(HSCH_2)_2(C_2H_5)CCH_2SCH_2CH_2S(SCH_2)_3$—,
$(HSCH_2)_3CCH_2S(CH_2)_3S(CH_2)_3$—,

(HSCH₂)₂CHCH₂ĊSCH₂CH₂CH₂——,

(HSCH₂)₃CCH₂ĊSCH₂CH₂CH₂——,

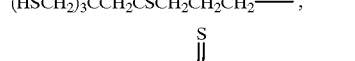
(HSCH₂)₂(C₂H₅)CCH₂SĊCH₂CH₂CH₂——,

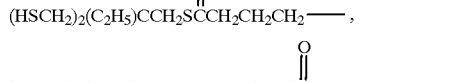
(HSCH₂)₂(C₂H₅)CCH₂SCH₂CH(CH₃)ĊOCH₂CH₂CH₂——, and the like.

The aminoorgano or mercaptoorgano organofunctional groups are bonded to silicon atoms contained in the organopolysiloxanes, preferably organopolysiloxanes containing moieties analogous to the foregoing formulae I, II, III, and IV, but wherein substituents other than aminoorgano and mercaptoorgano garoups are preferably R groups, more preferably methyl groups or lower alkoxy groups whose presence is sometimes dictated by the synthetic method employed. The alkoxy group content is thus in general less than 20 weight percent, more preferably less than 10 weight percent, and in general between about 0.1 weight percent and 8 weight percent.

The aminoorgano-functional fluids have amine equivalents of minimally about 0.01 meq/g, more preferably minimally 0.1 meq/g, and most preferably minimally 1 meq/g, and a maximum of preferably about 7 meq/g, more preferably 3 meq/g. The mercaptoorgano-functional organopolysiloxanes generally contain in excess of 0.01 weight percent —SH groups, more preferably in excess of 0.1 weight percent, and preferably less than 5 weight percent, more preferably less than 2 weight percent. Aminoalkyl- and mercaptoalkyl-functional, substantially linear polydimethylsiloxanes are preferred organofunctional organopolysiloxanes, most preferably those containing silsesquisiloxane groups having aminoorgano- or mercaptoorgano-functionality bonded thereto.

The amino-functional and mercapto-functional organopolysiloxanes may be prepared by conventional methods, i.e. by hydrosilylation of unsaturated amines or mercaptans by hydrogen-functional organopolysiloxanes in the presence of a hydrosilylation catalyst. Such functional organopolysiloxanes are available commercially.

It has been surprisingly discovered that not all blends of hydrophobic-modified organopolysiloxanes and organofunctional organopolysiloxanes are inherently suitable for use as mold releases. In particular, it has been discovered that suitability depends upon the physical stability of the blend.

Physical stability is assessed by a simple test involving centrifuging a 50 ml sample contained in a 50 ml conical centrifuge tube at 3000 rpm in an IEC Centra 8 Model 2476 centrifuige, manufactured by International Equipment Company. An angle rotor, 822a, is used. The sample is centrifuged for one hour. Samples are carefully drawn from the top and bottom following centrifuging, and analyzed for organofunctional group content. Standard analyses are used, for example acid titration for amino-functional siloxanes and silver nitrate titration for mercapto-functional siloxanes. Other analytical methods are suitable as well. A blend is stable if the mole ratio of functional groups in the top compared to the bottom is between 0.9 and 1.1, and preferably in the range of 0.93 to 1.07.

If the blend is stable, as described above, it will be suitable as an efficient mold release while also being paintable. Preferred stable blends contain from 0.02 to about 8 weight percent organofunctional organopolysiloxane, more preferably 0.05 to about 3.0 weight percent. Blends which are not stable are less effective as mold releases and also require vigorous cleaning in order to be painted successfully. Thus, stable, neat blends comprising organofunctional- and hydrophobically-modified organopolysiloxanes constitute one embodiment of the subject invention.

It has also been surprisingly discovered that blends of organofunctional- and hydrophobically-modified organopolysiloxanes which are not stable, i.e. those outside the top/bottom mol ratio of 0.9 to 1.1, will provide excellent mold release and yet be paintable, if dissolved in organic solvent in a concentration of about 10 weight percent or less, preferably less than 6 weight percent. Preferred organic solvents include aromatics such as toluene and xylene; alcohols such as isopropyl alcohol and n-propanol; aliphatic solvents such as mineral spirits, petroleum ether, heptane, cyclohexane, and the like; and volatile siloxanes such as hexamethylcyclotrisiloxane and octamethylcyclotetrasiloxane. The stability of these blends should be such that the top/bottom mol ratio is preferably between 0.5 and 1.4, and more preferably 0.8 to 1.2 when the concentration of siloxane components in the solvent is less than about 10 weight percent, and more preferably less than 6 weight percent. Exemplary blends are separation-prone blends containing from 3 weight percent to about 20 weight percent organofunctional organopolysiloxane, more preferably 3 weight percent to about 10 weight percent based on total organosilicon compound content. Stable blends may be applied from solvent as well. Unexpectedly, however, unstable, solvent-based formulations have proven to be superior to stable, solvent-based formulations when the concentrations of release agent blend is lower than about 10 weight percent.

The mold release agents of the subject invention, whether stable or unstable, may also be applied from aqueous emulsions or dispersions (both termed "emulsions" herein). Most preferably, microemulsions, i.e. those with dispersed phase particle sizes in the range of less than 1 $\mu$m are preferred. Such emulsions are prepared by conventional methods, and preferably employ a non-ionic surfactant having an HLB of 11–14, and preferably 12–13. Mixtures of surfactants having high and low HLB may also be used. The amount of surfactant is conventional, and generally ranges from about 3 weight percent to about 8 weight percent, more preferably 4 weight percent to 6 weight percent for an emulsion that contains 60 weight percent of the blend of this invention.

The amount of mold release employed in a molding operation will depend upon the material of which the mold is constructed, its surface finish, depth of section, molding temperature, etc., all well known to those skilled in the art. The amount will also depend upon the polymer being molded, with aggressively adhering polymers such as polyurethane RIM and epoxy generally requiring greater amounts. Polymers or their precursor reactive systems which contain internal mold releases, may require less mold release. The actual amount can be determined by simple trial error techniques. If necessary, neat mold release compositions can be diluted with a suitable solvent or emulsificated into water. The solutions and emulsions can be further diluted as necessary.

Additional mold release substances such as fatty alcohols, fatty esters, metal fatty carboxylates and soaps, etc., can be added if desired. Waxes, both natural and synthetic, may be added neat, in solution, or as a dispersion. Polydimethylsiloxane fluids may not, in general, be added, unless it is desired to employ the mold release for moldings which are not to be painted.

Additives, which may be useful, include hydrophobic silica with very small particle size, i.e. silica having a surface area greater than 40 m$^2$/g, preferably greater than 100 m$^2$/g. Preferably, any solid, non-soluble additives are present in amounts of less than 5 weight percent, more preferably less than 2 weight percent, in order to avoid buildup on the mold surface or surface contamination of the molded part.

Organic dyestuffs may be added to assist in determining where complete mold coverage has been obtained. Dyes are preferably absent, however.

Organic and inorganic viscosifiers may be useful, particularly for aqueous emulsions. Examples of suitable viscosifiers are the various vegetable gums, i.e. carrageenan, tragacanth, guar, acacia, and the like; various alkylated and carboxylated celluloses, such as carboxymethyl- and carboxypropylcellulose; polyacrylates, in particular polyacrylic acids and their copolymers, such as the various Carbopol™ and Acrysol™ polymers; and inorganic thickeners such as finely divided silicas and clay materials. Associative thickeners may also be useful. Examples of associative thickeners include hydrophobic polymers terminated with hydrophilic and/or polar groups, and in particular, polyoxyethylene/polyoxypro-pylene copolymers terminated with $C_{8-30}$ oxyalkylene moieties.

Having generally described this invention, a further understanding can be obtained by reference to certain specific examples which are provided herein for purposes of illustration only and are not intended to be limiting unless otherwise specified.

In the Examples which follow, a two part polyurethane molding composition is chosen due to its aggressive adhesive properties. A mold consisting of a cold rolled steel cylinder with a closed bottom, open top, and a height of one inch (2.54 cm) is used as a mold. The side walls are c.a. 0.25 inch (0.6 cm) thick. Candidate mold releases are applied liberally by brush, and fifteen grams of reactive polyurethane consisting of 69.4% by weight of Conthane® TU-401 Part A and 30.6% of Conthane® TU-401 Part B. both available from Tool Chemical Co., Madison Heights, Mich., are poured into the mold and allowed to cure for 2 hours at 80° C. in a forced air oven. Prior to pouring of the reactive polyurethane into the mold, the head of a $\frac{5}{16}$ inch (0.8 cm) diameter bolt is suspended into the center of the mold so that the head will be encapsulated. The opposite end of the bolt has a ring to enable withdrawal of the molded part from the mold. In some examples, open aluminum molds are used instead.

Mold release, or mold release component "Organosilicone Fluid L-42", available from Witco Corporation, Organosilicones Group, is believed to be a polyorganosiloxane containing methyl groups and α-methylphenylethyl groups bonded to the silicon atoms. Mold release or mold release component "Release Agent TN," available from Wacker Silicons, Adrian, Mich., is believed to be a similar organopolysitoxane containing methyl groups, phenylethyl groups, and dodecyl groups bonded to silicon. Both of these release agents correspond to the "hydrophobically-modified organopolysiloxanes" of the present invention.

COMPARATIVE EXAMPLE C1

A commercial mold release Organosilicone Fluid L-42 is applied to the mold prior to pouring in and curing the polyurethane. The molded part is allowed to cool to room temperature prior to determining the force required to remove the part from the mold. A Chatillon™ hand held gauge is attached to the ring and tension applied. The maximum force required for removal is noted. The part could not be removed. It had to be cut from the mold. The L-42 fluid provided no release.

COMPARATIVE EXAMPLE C2

The procedure of Comparison Example 2 is repeated except that Release Agent TN produced by Wacker Chemie is used instead of the L-42. The molded part could not be removed from the mold. The molded part has to be cut out of the mold. The release agent TN provides no release with this mold and this polymer system.

COMPARATIVE EXAMPLE C3

The procedure of Comparison Example C1 is repeated except a thin walled open aluminum dish is used for the mold and a bolt is not used. Release Agent TN produced by Wacker Chemie is used as the mold release. The aluminum must be separated from the part using pliers. It is very difficult to separate the part from the mold, which is torn into pieces as it is removed from the part. The molded part is painted with a red automotive acrylic lacquer, but the paint does not cover the part well. Another part is molded and separated from an aluminum dish and the part is wiped with a paper towel. The molded part is painted with a red automotive acrylic lacquer as before. A good coating is obtained and is free from orange peel and fish eye defects.

COMPARATIVE EXAMPLE C4

The procedure of Comparison Example C1 is repeated three times except that a blend consisting of 0.75 weight percent aminofunctional dimethylpolysiloxane and 99.25 weight percent methyl terminated dimethylpolysiloxane having a viscosity of 350 cSt is the release agent used. The aminofunctional dimethylpolysiloxane fluid has an amine content of 0.00014 equivalents per gram (0.14 meq/g), a methoxy content of 0.6 weight percent, has a viscosity of about 400 cSt, and an amine functionality which is a silsesquioxane group containing an aminoethylaminopropyl group. Only 1 lb of force is required to remove the part from the mold. The part is painted with no cleaning and the coating obtained is very irregular containing many fish eyes. Another part is wiped with a paper towel and then painted. While it is better than the first painted part, it still has many surface defects. The part is scrubbed with Citrikleen®, a Penetone Corporation product, and then is washed with water. The part is dried and then painted. Some fish eyes remain on the surface. This example illustrates the need for rigorous cleaning of parts molded with polysiloxanes that contain polydimethylsiloxane groups.

COMPARATIVE EXAMPLE C5

The procedure of Comparison Example C1 is repeated except the release composition is a blend consisting of 1 weight percent of a methoxy terminated dimethylpolysiloxane fluid that has a viscosity of about 12 cSt and 99 weight percent Release Agent TN described above. The dimethylpolysiloxane contains 7.4% methoxy groups. The test is done in triplicate. About 10 lbs of force is required to remove two of the parts. The third part would not release. This example demonstrates that the aminoorgano and/or mercaptoorgano functional groups of the subject invention are necessary to achieve good release. The parts are not painted.

COMPARATIVE EXAMPLE C6

The procedure of Comparison Example C5 is repeated except that the release composition first is dissolved in toluene, to a concentration of 10 weight percent. Two of the molded parts could not be separated from the molds. The third required 27.5 lbs of force to be removed. The parts are not painted. This example further demonstrates the necessity of the subject invention functional groups to achieve low release force, and also demonstrates that dilution with solvent normally results in molded parts adhering, more aggressively to the molds.

COMPARATIVE EXAMPLE C7

The procedure of Comparison Example C3 is followed. A solution consisting of 10 weight percent aminoftinctional dimethylpolysiloxane and 90 weight percent xylene is the release composition used. Three urethane parts are molded. The mold has to be torn into pieces as it is removed from the urethane part. The first part is painted with no cleaning and the coating obtained is very irregular containing many fish eyes. Another part is wiped with a paper towel and then painted. Its appearance is similar to the first part's appearance. It still has many surface defects. The third part is scrubbed with Citrikleen®, a Penetone Corporation product, and then is washed with water. The part is dried and then painted. The part has multiple fish eyes. This example shows that even with vigorous cleaning the aminofunctional dimethylpolysiloxane is not removed from the part, in addition to being a poor release agent.

EXAMPLE 1

A blend (A) is prepared by mixing 1 weight percent of an aminofunctional dimethylpolysiloxane with 99 weight percent Organosilicone Fluid L-42 produced by Witco Corporation, Organosilicones Group. A second blend (B) is prepared by mixing 1 weight percent of an aminofunctional dimethylpolysiloxane with 99 weight percent Release Agent TN produced by Wacker Chemie. The aminofunctional dimethylpolysiloxane fluid has an amine content of 0.0014 equivalents per gram (1.4 meq/g), a methoxy content of 7 weight percent, a viscosity of about 20 cSt, and an amine functionality which is a silsesquioxane group containing an aminoethylaminopropyl group. The (A) blend is clear and the (B) blend is cloudy. Both blends are formulations within the scope of the invention.

Each blend is applied to two molds and the procedure of Comparison Example C1 is followed to make molded parts. One part is painted immediately and the second part is painted after the surface of the part is wiped with a paper towel. The part molded with the (A) blend has a few minor defects on the unwiped part. The wiped part has no surface defects. The part molded with the (B) blend has several surface defects on the unwiped part. The wiped part is free of surface defects. Each part requires one pound of force to remove them from the mold. Excellent release is obtained.

The (B) blend is centrifuged for one hour at 3000 rpm. A sample from the top and bottom is titrated for amine content. The top contains 0.00016 equivalents per gram and the bottom contains 0.00017 equivalents per gram. The ratio of the functional group in the top to ratio of the functional group in the bottom is 0.94.

EXAMPLE 2

A blend (C) is prepared by mixing 1 weight percent of a mercaptan-functional dimethylpolysiloxane with 99 weight percent Release Agent TN. The mercaptan-functional dimethylpolysiloxane contains about 0.8 weight percent of SH groups, has a viscosity of about 70 cSt, and the mercaptan functionality is borne by a silsesquioxane group having an attached mercaptopropyl group. The resultant cloudy blend is centrifuged for one hour at 3000 rpm. A sample is withdrawn from the top and bottom. The mercaptan (SH) content is determined by titrating the blend with silver nitrate. The top is found to have 0.008 weight percent SH and the bottom is found to have 0.008 weight percent SH. The ratio of functional groups in the top to functional groups in the bottom is 1.0. Two urethane parts are prepared following the procedure of Comparison Example C1. One pound of force is required to remove the parts from the molds. The first part is painted and the coating, is very uneven and the paint does not cover the part effectively. The second part is wiped before it is painted and an even coating is obtained.

EXAMPLE 3

A blend (D) is prepared by mixing 3 weight percent of the mercaptan functional dimethylpolysiloxane of Example 2 with 97 weight percent Release Agent TN. The result cloudy blend is centrifuged for one hour at 3000 rpm. A sample is withdrawn from the top and bottom. The mercaptan (SH) content is determined by titrating the blend with silver nitrate. The top is found to have 0.013 weight percent SH and the bottom is found to have 0.026 weight percent SH. The ratio of the functional groups in the top to functional groups in the botom is 0.5. Two urethane parts are prepared following the procedure of Comparison Example C1. One pound of force was required to remove the parts from the molds. The first part was painted and the coating was very uneven and the paint does not cover the part effectively. The second part is wiped before it is painted. Orange peel and fish eyes are very apparent. A poor coating is obtained.

The blend (D) is mixed with xylene to a 10 weight percent concentration. Two urethane parts are prepared following the procedure of Comparison Example C1. A force of about 5 pounds is required to remove the parts from the mold. The first part is painted and a good coating is obtained. The second part is wiped and it is then painted. An excellent coating is obtained.

EXAMPLE 4

The blend (B) from Example 1 is mixed with xylene to a 10 weight percent concentration. The resultant solution is applied to two molds and two urethane parts are molded following the procedure of Comparison Example C1. The first part is painted and an excellent coating is obtained. A release force of 8.3 pounds is required to remove the urethane parts from the molds. The procedure is repeated with a 5 weight percent solution of (B) in xylene. A force of 30 pounds does not remove the part from the mold. The xylene solution does not contain enough mold release, although it may be suitable for less aggressively adhering polymers, e.g. polypropylene.

EXAMPLE 5

A blend (F) is prepared by mixing 5 weight percent aminofunctional dimethylpolysiloxane with 95 weight percent Release Agent TN produced by Wacker-Chemie. The aminofunctional dimethylpolysiloxane fluid has an amine content of 0.0014 equivalents per gram (1.4 meq/g), a methoxy content of 7 weight percent, a viscosity of about 20 cSt, and has amine functionality in silsesquioxane groups containing an aminoethylaminopropyl group. The (F) blend is cloudy. The blend is centrifuged for one hour at 3000 rpms. A sample from the top and bottom is titrated for amine content. The top contains 0.000067 equivalents per gram and the bottom contains 0.000085 equivalents per gram. The ratio of functional groups in the top to functional groups in the bottom is 0.79.

A solution consisting of 5 weight percent of the (F) blend in xylene is applied to two molds and the procedure of Comparison Example C1 is followed to make molded parts. One part is painted immediately and the second part was painted after the surface of the part is wiped with a paper towel. The part molded with the blend has a few minor defects on the unwiped part. The wiped part has no surface defects. Each part requires 4.3 pounds of force to remove them from the mold.

EXAMPLE 6

A blend (G) is prepared by mixing 1 weight percent aminofunctional dimethylpolysiloxane and 99 weight percent Release Agent TN produced by Wacker-Chemie. The aminofunctional dimethylpolysiloxane fluid has an amine content of 0.00014 equivalents per gram (0.14 meq/g), a methoxy content of 0.6 weight percent, a viscosity of about 400 cSt, and bears silsesquioxane groups containing an aminoethylaminopropyl group. The blend is cloudy. The blend is applied to two molds and the procedure of Comparison Example C1 is followed to make molded parts. One part is painted immediately and the second part is painted after the surface of the part is wiped with a paper towel. The unwiped part has numerous surface defects. The wiped part has no surface defects. Each part requires one pound of force to remove them from the mold. Excellent release is obtained.

The (G) blend is centrifuged for one hour at 3000 rpms. A sample from the top and bottom is titrated for amine content. The top contains 0.000002 equivalents per gram and the bottom contains 0.000002 equivalents per gram. The ratio of the functional group in the top to ratio of the functional group in the bottom is 1.0.

EXAMPLE 7

A blend (H) is prepared by mixing 1 weight percent aminofunctional dimethylpolysiloxane and 99 percent Release Agent TN produced by Wacker-Chemie. The aminofunctional dimethylpolysiloxane fluid has an amine content of 0.0005 equivalents per gram (0.5 meq/g), a methoxy content of 2.6 weight percent, a viscosity of about 60 cSt, and contains silsesquioxane groups containing an aminoethylaminopropyl group. The blend is cloudy. The blend is applied to two molds and the procedure of Comparison Example C1 is followed to make the molded parts. One part is painted immediately and the second part is painted after the surface of the part was wiped with a paper towel. The unwiped part has numerous surface defects. The wiped part has no surface defects. The parts require 1.8 pounds of force to remove them from the mold. Excellent release is obtained.

The (G) blend is centrifuged for one hour at 3000 rpms. A sample from the top and bottom is titrated for amine content. The top contains 0.000005 equivalents per gram and the bottom contains 0.000005 equivalents per gram. The ratio of functional groups in the top to functional groups in the bottom is 1.0.

EXAMPLE 8

A blend (I) is prepared by mixing 1 weight percent of a methyl terminated aminofunctional dimethylpolysiloxane with 99 weight percent Release Agent TN produced by Wacker Chemle. The aminofunctional dimethylpolysiloxane fluid has an amine content of 0.00014 equivalents per gram (0.14 meq/g), a viscosity of about 500 cSt, and contains silsesquioxane groups containing an aminoethylaminopropyl group. The blend is cloudy. The blend is applied to two molds and the procedure of Comparison Example C1 is followed to make molded parts. One part is painted immediately and the second part is painted after the surface of the part is wiped with a paper towel. The unwiped part has numerous surface defects. The wiped part has no surface defects. The parts require 1 pound of force to remove them from the mold. Excellent release is obtained.

EXAMPLE 9

An emulsion of the (B) blend is prepared by mixing 7.0 parts of nonionic surfactant with 6 parts of water. To the resultant mixture is added the (B) blend, 60 parts. To that mixture is added slowly 33 parts of water. A stable white emulsion is obtained, with a dispersed phase particle size of 309 nanometers. The emulsion is applied to a mold as described in Comparison Example C1. The mold is allowed to dry and then a urethane part is made in accordance to the procedure of Comparison Example C1. The urethane part could be separated from the mold.

The foregoing experiments demonstrate that hydrophobically modified organopolysiloxanes do not provide high release capability, particularly when used with reactive polyurethanes in deep section molds (Comparative Examples C1–C3). However, if removal from the mold is possible at all, the parts are not immediately paintable, but may be successfully painted following wiping of the surface with a dry towel or rag (Comparative Example C3).

The experiments also show that blends of aminofunctional fluids and conventional polydimethylsiloxane fluids (Comparative Example C4) provide excellent release, but exceptionally poor paintability. Such mold release compositions are not useable in many applications, for example as mold releases for automotive polyurethane RIM parts.

In Comparison Example C5, the importance of aminoalkyl- or mercaptoalkyl-functional groups in the organofunctional organopolysiloxane are demonstrated. Substitution of a methoxy-functional siloxane for the organofunctional siloxanes of the subject invention required a higher than desired release force, when parts could be released at all. Comparative Example C6 illustrates that applying the neat mold release of Comparative Example C5 dissolved in solvent does not improve the release, rather, the part adheres more aggressively to the mold.

Comparison Example C7 demonstrates that aminoalkyl-functional fluids alone are very inefficient mold release agents. Despite employing a shallow section mold, the mold must be destroyed while being removed from the part. Moreover, the part exhibited almost complete failure with respect to paintability, even after cleaning with a powerful cleaning agent and washing with water.

Examples 1 and 2 demonstrate the effectiveness of neat, stable blends of hydrophobic-modified orgyanopolysiloxane and organofunctional organopolysiloxane. Both the A and B examples exhibited exceptional release properties as well as good paintability after wiping. Example 6 demonstrates that a stable blend containing only one tenth the amount of aminoalkyl-functionality as used in Example 1 still provides exceptional release. Example 7 is intermediate to these examples in terms of aminoalkyl-functionality.

Example 3 demonstrates that unstable (top/bottom functional group mol ratio 0.5) blends of hydrophobic-modified organopolysiloxane and organofunctional organopolysiloxane provide excellent mold release despite the instability, but are quite deficient as to paintability. Surprisingly, however, upon dilution with solvent, a modest increase in release force is observed, but paintability is restored. Unstable blends are suitable when dissolved in solvent. Example 5 illustrates that unstable (top/bottom mol ratio 0.79) blends are satisfactory if dissolved in solvent.

Example 4 illustrates that the release force may be altered by increasing or decreasing solvent content of mold release solutions. It is noted in general that higher solvent content, and indeed the presence of any solvent, increases the force required to release the part. Example 9 indicates that aqueous emulsions of the subject compositions also function as effective mold release compositions.

The invention disclosed herein can be practiced with any combination of named, necessary ingredients, particularly those identified as "preferred", to the exclusion of other ingredients named or unnamed. The necessary ingredients comprise a hydrophobic-modified organopolysiloxane and an oranofunctional organopolysiloxane, as herein defined, in a neat stable blend, or a stable or unstable blend dissolved in organic solvent or emulsified to form an aqueous dispersion. By the terms "a" and "an" are meant "one or more" unless the context clearly indicates otherwise.

By the term "unstable analog of" in reference to a stable composition is meant a different composition in terms of ingredient amounts, molecular weight, hydrophobic group content, functional group content or other property or composition or combination thereof, but belonging to the same general class of composition, the unstable composition having a "top/bottom mol ratio" outside the range of 0.9 to 1.1. By "top/bottom mol ratio" is meant the mol ratio of functional groups in the top and bottom of a sample after centrifugation as defined previously.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A neat mold release composition providing for molded part paintability, comprising a stable blend of hydrophobic-modified organopolysiloxane and an organofunctional organopolysiloxane, said organofunctional organopolysiloxane containing aminoorgano-functional, mercaptoorgano-functional, or both aminoorgano- and mercaptoorgano-functional groups.

2. The neat mold release composition of claim 1, wherein said hydrophobic-modified oranopolysiloxane comprises a branched or linear polyorganosiloxae comprising moieties of the formulae

 (I)

 (II)

and optionally, moieties of either or both of the formulae

 (III)

or

 (IV)

wherein

R is lower alkyl or alkylene, optionally interrupted by ether oxygen or thioether sulfur;

$R^1$ is a $C_4$–$C_{30}$ hydrophobic group optionally containing not more than one ether oxygen or thioether sulfur when the carbon content is less than $C_{10}$, and not more than two ether oxygen or thioether sulfur atoms when the carbon content is $C_{10}$ or greater, $R^1$ containing insufficient interspersed —O— and/or —S— atoms to defeat the hydrophobicity of the $R^1$ hydrophobic group wherein a and b are 0, 1, 2, or 3, and the sum (a+b) is 3 for formula (I), 2 for formula (II), and 1 for formula (III), with the proviso that the hydrophobic-modified organopolysiloxane contain at least one $R^1$ hydrophobic group.

3. The neat mold release of claim 1 wherein said organofunctional organopolysiloxane contains at least one $R^6$ HN—X— organofunctional group, at least one HS—X— organofunctional group, or at least one $R^6$ HN—X— organofunctional group and at least one HS—X— organofunctional group, wherein X is a $C_{1-30}$ hydrocarbon linking group optionally containing one or more interposed hetroatoms selected from the group consisting of —O—, —S—, and heteroatom-containing groups

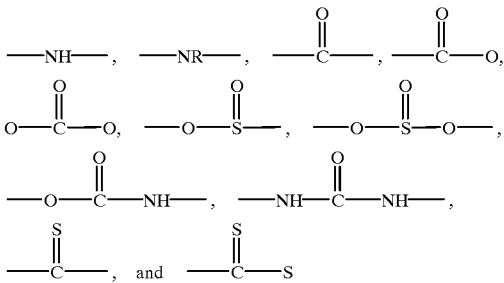

wherein $R^6$ s hydrogen a $C_1$–$C_{18}$ alkyl or aryl radical.

4. The neat mold release of claim 2 wherein said organofunctional organopolysiloxane contains at least one $R^6$ HN—X— organoftinctional group, at least one HS—X— organofunctional group, or at least one $R^6$ HN—X— organofunctional group and at least one HS—X— organofunctional group, wherein X is a $C_{1-30}$ hydrocarbon linking group optionally containing one or more interposed hetroatoms of —O—, —S—, and heteroatom-containing groups

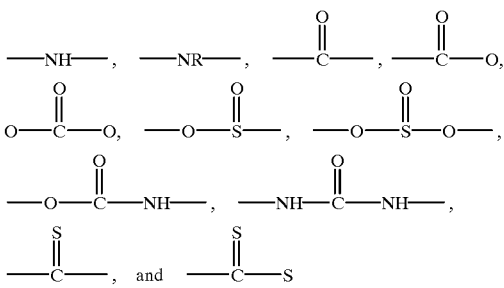

wherein $R^6$ is hydrogen or a $C_1$–$C_{18}$ alkyl or aryl radical.

5. The neat mold release composition claim 1, wherein said aminoorgano-functional organopolysiloxane contains aminoorgano groups corresponding to the formulae VI

 (VI)

in which $R^5$ is a divalent $C_1$–$C_{18}$-hydrocarbon radical, $R^6$ is a hydrogen atom or an unsubstituted $C_1$–$C_{10}$-alkyl radical, $R^7$ is a divalent $C_1$–$C_{18}$-hydrocarbon radical , $R^8$ is a hydrogen atom or an unsubstituted $C_1$–$C_{10}$-alkyl radical or aryl radical, $R^9$ is a hydrogen atom or an unsubstituted $C_1$–$C_{10}$-alkyl radical or aryl radical and t is an integer from 0 to 6.

6. The neat mold release of claim 1, wherein at least one of said mercaptoorgano groups is selected from the group consisting of

—$CH_2SH$,

—$C_2H_4SH$,

—$C_3H_6SH$, $(HSCH_2)_2CHCH_2CH_2$—, $(HSCH_2CH_2)(HSCH_2)CH(CH_2)_4$—, $(HSCH_2)CH_2)_3CCH_2CH_2$—, $(HSCH_2CH_2)(HSCH_2)CHCH(CH_2SH)CH_2CH_2CH_2$—, $HS(CH_2)_5CH(CH_2CH_2SH)CH_2CH_2CH(CH_2CH_3)$—, $(HSCH_2CH_2)_2CHCH_2CH_2$—, (HSCH$_2$)$_2$CHSCH$_2$CH$_2$CH$_2$—,
(HSCH$_2$)$_2$(C$_2$H$_5$)CCH$_2$SCH$_2$CH$_2$CH$_3$—,
(HSCH$_2$)$_3$CCH$_2$SCH$_2$CH$_2$CH$_2$—,
(HSCH$_2$)(HSCH$_2$CH$_2$CH$_2$CH$_2$)CHSCH$_2$CH$_2$CH$_2$—,
(HSCH$_2$CH$_2$)$_2$CHCH$_2$SCH$_2$CH$_2$CH$_2$—,
(HSCH$_2$)$_2$(C$_2$H$_5$)CCH$_2$SCH$_2$CH$_2$S(SCH$_2$)$_3$—,
(HSCH$_2$)$_3$CCH$_2$S(CH$_2$)$_3$S(CH$_2$)$_3$—,

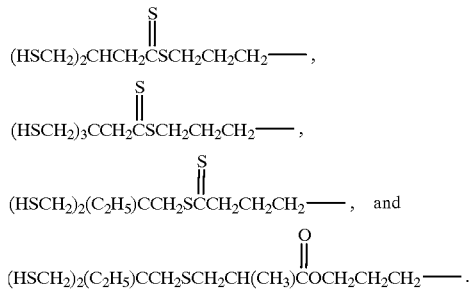

7. The neat mold release of claim 5, wherein at least one of said mercaptoorgano groups is selected from the group consisting of
—CH$_2$SH,
—C$_2$H$_4$SH,
—C$_3$H$_6$SH, (HSCH$_2$)$_2$CHCH$_2$CH$_2$—,
(HSCH$_2$CH$_2$)(HSCH$_2$)CH(CH$_2$)$_4$—,
(HSCH$_2$)CH$_2$)$_3$CCH$_2$CH$_2$—,
(HSCH$_2$CH$_2$)(HSCH$_2$)CHCH(CH$_2$SH)CH$_2$CH$_2$CH$_2$—,
HS(CH$_2$)$_5$CH(CH$_2$CH$_2$SH)CH$_2$CH$_2$CH(CH$_2$CH$_3$)—,
(HSCH$_2$CH$_2$)$_2$CHCH$_2$CH$_2$—,
(HSCH$_2$)$_2$CHSCH$_2$CH$_2$CH$_2$—,
(HSCH$_2$)$_2$(C$_2$H$_5$)CCH$_2$SCH$_2$CH$_2$CH$_3$—,
(HSCH$_2$)$_3$CCH$_2$SCH$_2$CH$_2$CH$_2$—,
(HSCH$_2$)(HSCH$_2$CH$_2$CH$_2$CH$_2$)CHSCH$_2$CH$_2$CH$_2$—,
(HSCH$_2$CH$_2$)$_2$CHCH$_2$SCH$_2$CH$_2$CH$_2$—,
(HSCH$_2$)$_2$(C$_2$H$_5$)CCH$_2$SCH$_2$CH$_2$S(SCH$_2$)$_3$—,
(HSCH$_2$)$_3$CCH$_2$S(CH$_2$)$_3$S(CH$_2$)$_3$—,

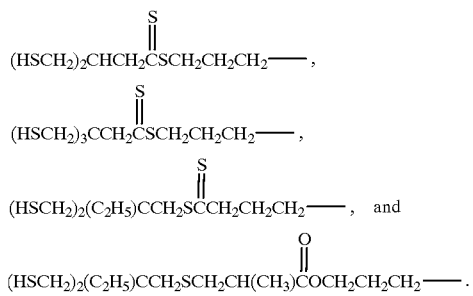

8. The neat mold release composition of claim 1, wherein the top/bottom functional group mol ratio is between about 0.93 and about 1.07.

9. The neat mold release of claim 1, wherein the organofunctional organopolysiloxanes comprise one or more polydimethylsiloxanes selected from the group consisting of γ-aminopropyl-functional polydimethylsiloxanes, β-aminoethylaminopropyl-functional polydimethylsiloxanes, and γ-mercaptopropyl-functional polydimethylsiloxanes.

10. A solution of mold release in organic solvent which provides molded part paintability, the solution comprising, in addition to one or more organic solvents, one or more of a) the stable mold release composition of claim 1;
b) an unstable mold release composition comprising a hydrophobic-modified organopolysiloxane and an organofunctional organopolysiloxane having aminoorgano, mercaptoorgano, or both aminoorgano and mercaptoorgano functionality having a top/bottom functional group mol ratio less than 0.9 or greater than 1.1, wherein said hydrophobic-modified organopolysiloxane contains x siloxy groups of the formula

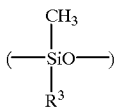

and y siloxy groups of the formula

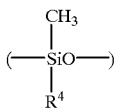

wherein $R^3$ is an aryl or aralkyl group, $R^4$ is a $C_{8-20}$ alkyl group, and x and y are positive whole numbers from 3 to 250.

11. A solution of mold release in organic solvent which provides molded part paintability, the solution comprising, in addition to one or more organic solvents, one or more of a) the stable mold release composition of claim 1;
b) an unstable mold release composition comprising hydrophobic-modified organopolysiloxane and organofunctional organopolysiloxane having a top/bottom ratio less than 0.9 or greater than 1.1, wherein said hydrophobic-modified organopolysiloxane comprises a branched or linear polyorganosiloxane comprising moieties of the formulae

  (I)

  (II)

and optionally, moieties of either or both of the formulae

  (III)

or

  (IV)

wherein

R is lower alkyl or alkylene, optionally interrupted by ether oxygen or thioether sulfur;

$R^1$ is a $C_4$–$C_{30}$ hydrophobic group optionally containing not more than one ether oxygen or thioether sulfur when the carbon content is less than $C_{10}$, and not more than two ether oxygen or thioether sulfur atoms when the carbon content is $C_{10}$ or greater, $R^1$ containing insufficient interspersed —O— and/or —S— atoms to defeat the hydrophobicity of the $R^1$ hydrophobic group wherein a and b are 0, 1, 2, or 3, and the sum (a+b) is 3 for formula (I), 2 for formula (II), and 1 for formula (III), with the proviso that said hydrophobic-modified organopolysiloxane contains x siloxy groups of the formula

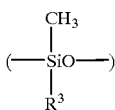

and contains y siloxy groups of the formula

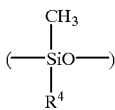

wherein $R^3$ is an aryl or aralkyl group, $R^4$ is a $C_{8-20}$ alkyl group, and x and y are positive whole numbers from 3 to 250.

12. A solution of mold release in organic solvent which provides molded part paintability, the solution comprising, in addition to one or more organic solvents, one or more of
a) the stable mold release composition of claim 1;
b) an unstable mold release composition comprising a hydrophobic-modified organopolysiloxane and an organofunctional organopolysiloxane having aminoorgano, mercaptoorgano, or both aminoorgano and mercaptoorgano functionality having a top/bottom ratio less than 0.9 or greater than 1.1, wherein said organofunctional organopolysiloxane contains
at least one $R^6HN-X-$ organofunctional group, at least one $HS-X-$ organofunctional group, or at least one $R^6HN-X-$ and at least one $HS-X-$ organofunctional group,
wherein X is a $C_{1-30}$ hydrocarbon linking group optionally containing one or more interposed hetroatoms of —O— and —S— and heteroatom-containing groups

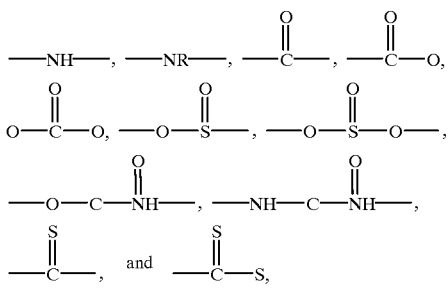

wherein said hydrophobic-modified organopolysiloxane contains x siloxy groups of the formula

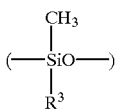

and y siloxy groups of the formula

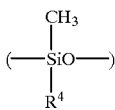

wherein $R^3$ is an aryl or aralkyl group, $R^4$ is a $C_{8-20}$ alkyl group, and x and y are positive whole numbers from 3 to 250.

13. A solution of mold release in organic solvent which provides molded part paintability, the solution comprising, in addition to one or more organic solvents, one or more of
a) the stable mold release composition of claim 1;
b) an unstable mold release composition comprising hydrophobic-modified organopolysiloxane and an aminoorgano-functional organopolysiloxane, said composition having a top/bottom ratio less than 0.9 or greater than 1.1 wherein said aminoorgano-functional organofunctional organopolysiloxane contains aminoalkyl groups corresponding to the formulae VI

in which
$R^5$ is a divalent $C_1-C_{18}$-hydrocarbon radical,
$R^6$ is a hydrogen atom or an unsubstituted $C_1-C_{18}$-alkyl radical,
$R^7$ is a divalent $C_1-C_{18}$-hydrocarbon radical,
$R^8$ is a hydrogen atom or an unsubstituted $C_1-C_{10}$-alkyl radical or aryl radical,
$R^9$ is a hydrogen atom or an unsubstituted $C_1-C_{10}$-alkyl radical or aryl radical, and
t is an integer from 0 to 6, wherein said hydrophobic-modified organopolysiloxane and wherein said hydrophobic-modified organopolysiloxane contains x siloxy groups of the formula

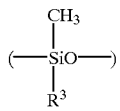

and y siloxy groups of the formula

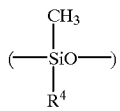

wherein $R^3$ is an aryl or aralkyl group, $R^4$ is a $C_{8-20}$ alkyl group, and x and y are positive whole numbers from 3 to 250.

14. A solution of mold release in organic solvent which provides molded part paintability, the solution comprising, in addition to one or more organic solvents, one or more of
a) the stable mold release composition of claim 1;
b) an unstable mold release composition comprising a hydrophobic-modified organopolysiloxane and an organofunctional organopolysiloxane having a top/bottom ratio less than 0.9 or greater than 1.1 wherein organofunctional organopolysiloxane bears a mercaptoorgano group selected from the group consisting of
—$CH_2SH$,
—$C_{24}SH$,
—$C_3H_6SH$, $(HSCH_2)_2CHCH_2CH_2—$,
$(HSCH_2CH_2)(HSCH_2)CH(CH_2)_4—$,
$(HSCH_2)CH_2)_3CCH_2CH_2—$,
$(HSCH_2CH_2)(HSCH_2)CHCH(CH_2SH)CH_2CH_2CH_2—$,
$HS(CH_2)_5CH(CH_2CH_2SH)CH_2CH_2CH(CH_2CH_3)—$,
$(HSCH_2CH_2)_2CHCH_2CH_2—$,
$(HSCH_2)_2CHSCH_2CH_2CH_2—$, (HSCH$_2$)$_2$(C$_2$H$_5$)CCH$_2$SCH$_2$CH$_2$CH$_3$—,
(HSCH$_2$)$_3$CCH$_2$SCH$_2$CH$_2$CH$_2$—,
(HSCH$_2$)(HSCH$_2$CH$_2$CH$_2$CH$_2$)CHSCH$_2$CH$_2$CH$_2$—,
(HSCH$_2$CH$_2$)$_2$CHCH$_2$SCH$_2$CH$_2$CH$_2$—,
(HSCH$_2$)$_2$(C$_2$H$_5$)CCH$_2$SCH$_2$CH$_2$S(SCH$_2$)$_3$—,
(HSCH$_2$)$_3$CCH$_2$S(CH$_2$)$_3$S(CH$_2$)$_3$—,

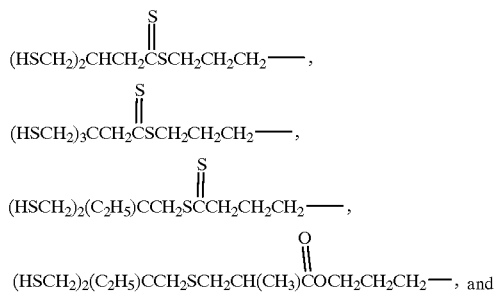

mixtures thereof.

15. A solution of mold release in organic solvent which provides molded part paintability, the solution comprising, in addition to one or more organic solvents, one or more of
   a) the stable mold release composition of claim 1 wherein the top/bottom functional group mol ratio is between about 0.93 and about 1.07;
   b) an unstable mold release composition comprising a hydrophobic-modified organopolysiloxane and an organofunctional organopolysiloxane having, aminoorgano, mercaptoorgano, or both aminoorgano and mercaptoorgano functionality having a top/bottom ratio less than 0.9 or greater than 1.1, wherein said hydrophobic-modified organopolysiloxane contains x siloxy groups of the formula

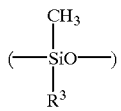

and y siloxy groups of the formula

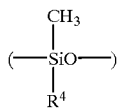

wherein R$^3$ is an aryl or aralkyl group, R$^4$is a C$_{8\text{-}20}$ alkyl group, and x and y are positive whole numbers from 3 to 250.

16. A solution of mold release in organic solvent which provides molded part paintability, the solution comprising, in addition to one or more organic solvents, one or more of
   a) the stable mold release composition of claim 1;
   b) an unstable mold release composition comprising hydrophobic-modified organopolysiloxane and organo-functional organopolysixolane having a top/bottom functional group mol ratio less than 0.9 or greater than 1.1, wherein the organofunctional organopolysiloxane comprises one or more polydimethylsiloxaneene wherein said hydrophobic-modified organopolysiloxane contains x siloxy groups of the formula

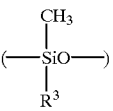

and y siloxy groups of the formula

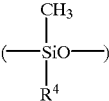

wherein R$^3$ is an aryl or aralkyl group, R$^4$is a C$_{8\text{-}20}$ alkyl group, and x and y are positive whole numbers from 3 to 250.

17. A solvent-based mold release for producing paintable molded parts, comprising an unstable neat blend of a hydrophobic organopolysiloxane and an organofunctional organopolysiloxane selected from the group consisting of aminoorgano-functional, mercapto organo-functional, and both amino- and mercaptoorgano-functional organopolysiloxanes, dissolved in a solvent, wherein said hydrophobic-modified organopolysiloxane contains x siloxy groups of the formula

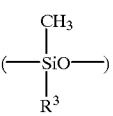

and y siloxy groups of the formula

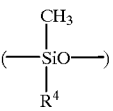

wherein R$^3$ is an aryl or aralkyl group, R$^4$ is a C$_{8\text{-}20}$ alkyl group, and x and y are positive whole numbers from 3 to 250.

18. The solvent-based mold release of claim 17 wherein said organofunctional organopolysiloxane is an aminoalkyl-functional organopolysiloxane, wherein said hydrophobic-modified organopolysiloxane contains x siloxy groups of the formula

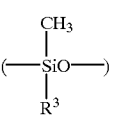

and y siloxy groups of the formula

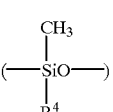

wherein R$^3$is an aryl or aralkyl group, R$^4$ is a C$_{8\text{-}20}$ alkyl group, and x and y are positive whole numbers from 3 to 250.

19. The solvent-based mold release of claim 17 wherein said organofunctional organopolysiloxane is a mercaptoalkyl-functional organopolysiloxane.

* * * * *